(12) United States Patent
Okada et al.

(10) Patent No.: US 7,842,419 B2
(45) Date of Patent: Nov. 30, 2010

(54) ELECTROACTIVE MATERIAL AND USE THEREOF

(75) Inventors: Shigeto Okada, Kasuga (JP); Jun-ichi Yamaki, Kasuga (JP); Hideyuki Yamamura, Toyota (JP); Shigeru Fujino, Kasuga (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1195 days.

(21) Appl. No.: 11/413,207

(22) Filed: Apr. 28, 2006

(65) Prior Publication Data

US 2006/0194104 A1    Aug. 31, 2006

Related U.S. Application Data

(63) Continuation of application No. PCT/JP2004/016508, filed on Nov. 1, 2004.

(30) Foreign Application Priority Data

Oct. 31, 2003    (JP) .............................. 2003-373358

(51) Int. Cl.
    H01M 4/58    (2010.01)
(52) U.S. Cl. ............. 429/218.1; 429/231.5; 429/231.95
(58) Field of Classification Search .............. 429/218.1, 429/221, 231.5, 231.95
    See application file for complete search history.

(56) References Cited

U.S. PATENT DOCUMENTS 4,837,094 A * 6/1989 Kudo ....................... 428/836.2

FOREIGN PATENT DOCUMENTS

| JP | 8-315858 | 11/1996 |
|---|---|---|
| JP | 10-134813 | 5/1998 |
| JP | 10-223225 | 8/1998 |
| JP | 10-340723 | 12/1998 |
| JP | 2003-157841 | 5/2003 |
| JP | 2003-157842 | 5/2003 |
| WO | WO 2005/043655 A1 | 5/2005 |

OTHER PUBLICATIONS

A. Ibarra Palos, "Reversible lithium intercalation in amorphous iron borate," *J. Solid State Elecctrochem.*, (2002)6: pp. 134-138.

(Continued)

*Primary Examiner*—Helen O Conley
(74) *Attorney, Agent, or Firm*—Finnegan, Henderson, Farabow, Garrett & Dunner, LLP (57) ABSTRACT

An electroactive material and a method of manufacturing the same is provided, in which the primary component of the electroactive material is a metal boron oxide complex, and the electroactive material exhibits excellent charge/discharge characteristics. The electroactive material of the present invention is primarily composed of an amorphous metal complex represented by the general formula $M_{2-2x}O_{2x}O_3$. M is one or two or more metal elements selected from the transition metal elements, e.g., Fe or V. In addition, x is 0<x<1, e.g., ½. This type of electroactive material can be manufactured by amorphizing the metal complex represented by the general formula $M_{2-2x}O_{2x}O_3$ by means of a mechanical milling method. In addition, the electroactive material can be manufactured by rapidly cooling and solidifying a mixture containing an oxide in which M is a constituent metal element and a boron oxide from the melted state.

15 Claims, 4 Drawing Sheets

OTHER PUBLICATIONS

Supp. European Search Report dated Feb. 23, 2009.

Okada S., et al., "Anode properties of calcite-type $MBO_3$ (M:V, Fe)," *J. Power Sources*, 119-121 (2003), pp. 621-625.

Ibarra-Palos A., et al., "Electrochemical Reactions of Iron Borates with Lithium: Electrochemical and in Situ Mössbauer and X-ray Absorption Studies," *Chem. Mater.*, vol. 14, No. 3 (2002), pp. 1166-1173.

Rowsell J.L.C., et al., "A new class of materials for lithium-ion batteries: iron (III) borates," *J. Power Sources* 97-98 (2001), pp. 254-257.

Legagneur V., et al., "$LiMBO_3$ (M=Mn, Fe, Co): synthesis, crystal structure and lithium deinsertion/insertion properties," *Solid State Ionics*, 139 (2001), pp. 37-46.

Office Action from the Canadian Patent Office for Canadian Appl. No. 2,543,721 dated Apr. 7, 2010.

* cited by examiner

ELECTROACTIVE MATERIAL AND USE THEREOF

CROSS REFERENCE TO RELATED APPLICATIONS

This application is a Continuation of PCT International Application No. PCT/JP2004/016508, filed on Nov. 1, 2004, the content of which is incorporated herein by reference.

The present application claims priority to Japanese patent application number 2003-373358 filed on Oct. 31, 2003, and the entire contents of that application is incorporated by reference into this specification.

FIELD OF THE INVENTION

The present invention relates to an electroactive material that is ideal as a constituent material of a battery and a method of manufacturing the same. In addition, the present invention relates to a secondary battery that employs this type of electroactive material.

BACKGROUND OF THE INVENTION

Secondary batteries are known which are charged and discharged by means of cations such as lithium ions traveling between both electrodes. A typical example of this type of secondary battery is a lithium ion secondary battery. A material that can store/discharge lithium ions can be employed as the electroactive material of this secondary battery. Examples of an anode active material include carbonaceous materials such as graphite. Examples of a cathode active material include oxides whose constituent elements are lithium and a transition metal, such as lithium nickel oxides, lithium cobalt oxides, and the like (hereinafter referred to as "lithium containing compound oxide").

Various materials are being studied as cathode active materials or anode active materials from the viewpoint of improving the functionality and capacity, and reducing the cost, of this type of secondary battery. For example, an electroactive material whose primary component is an iron complex represented by the general formula $FeBO_3$ is disclosed in Japanese published patent application H10-134813. In addition, Japanese published patent application 2003-157841 is another prior art reference relating to an electroactive material that is composed of a metal boron oxide complex. Here, it would be useful if a boron oxide type of electroactive material is provided which can achieve more favorable battery characteristics.

Accordingly, one object of the present invention is to provide an electroactive material whose primary component is a metal boron oxide complex, and which exhibits favorable battery characteristics (e.g., charge/discharge characteristics). Another object of the present invention is to provide a method of manufacturing this type of electroactive material. Yet another object of the present invention is to provide a non-aqueous electrolyte secondary battery comprising this electroactive material. Yet another object of the present invention is to provide an electrode for use in a battery that comprises this electroactive material and a method of manufacturing the same.

DISCLOSURE OF THE INVENTION

The present inventor(s) discovered that the battery characteristics of an electroactive material whose primary component is a metal boron oxide complex can be improved by employing an amorphous metal boron oxide as the complex, and thereby completed the present invention.

According to the present invention, an electroactive material is provided whose primary component is a metal complex represented by the general formula $M_{2-2x}B_{2x}O_3$. M in the aforementioned general formula is one or two or more elements selected from the transition metal elements. x is a number that satisfies $0<x<1$. In addition, the metal complex that forms the electroactive material is amorphous.

The metal complex represented by the aforementioned general formula can have a large theoretical capacity because the electrochemical equivalent is relatively small. In addition, an amorphous metal complex like that described above can provide an electroactive material that exhibits more favorable charge/discharge characteristics than those of a crystalline metal complex. According to this electroactive material, at least one of the following effects can be achieved: an improvement in the initial electric charge capacity (initial capacity), an improvement in the initial discharge electric capacity (initial reversible capacity), a reduction in the difference between the initial capacity and the initial reversible capacity (irreversible capacity), a reduction in the ratio of the irreversible capacity with respect to the initial capacity (irreversible capacity/initial capacity), and the like. Specific examples of M in the aforementioned general formula include iron (Fe), vanadium (V), and titanium (Ti). In addition, because the aforementioned metal complex is amorphous, x in the aforementioned general formula can be a diverse number. For example, metal complexes can be employed in which x is ½($MBO_3$), ⅓($M_4B_2O_9$), ¼($M_3BO_6$), and the like.

In one preferred aspect of the electroactive material disclosed herein, M in the aforementioned general formula is primarily Fe. In other words, about half or more of the M that forms the metal complex is Fe. Preferably, about 75 atom % or more of M is Fe, more preferably about 90 atom % or more is Fe, and even more preferably M is substantially Fe. This type of metal complex can be represented by the general formula $Fe_yM^1_{1-y}BO_3$ when, for example, x in the aforementioned general formula $M_{2-2x}B_{2x}O_3$ is ½. In this general formula, $M^1$ is one or two or more transition metal elements selected from the transition metal elements other than Fe (V, Ti, etc.). In addition, y is a number that satisfies $0.5 \leq y \leq 1$.

In another preferred aspect of the electroactive material disclosed herein, M in the aforementioned general formula is primarily V. In other words, about half or more of the M that forms the metal complex is V. Preferably, about 75 atom % or more of M is V, more preferably about 90 atom % or more is V, and even more preferably M is substantially V. This type of metal complex can be represented by the general formula $V_zM^2_{1-z}BO_3$ when, for example, x in the aforementioned general formula $M_{2-2x}B_{2x}O_3$ is ½. In this general formula, $M^2$ is one or two or more transition metal elements selected from the transition metal elements other than V (Fe, Ti, etc.). In addition, z s a number that satisfies $0.5 \leq z \leq 1$.

Because this type of electroactive material exhibits improved charge/discharge characteristics, it is suitable as an electroactive material of a secondary battery (preferably, a secondary battery comprising a non-aqueous electrolyte). The electroactive material can also be employed as a cathode active material or an anode active material by selecting other battery constituent materials (particularly the electroactive materials that form the other electrode). It is normally preferable to employ the electroactive material according to the present invention as an anode active material. When M in the aforementioned general formula is one or two or more metal elements selected from V and Ti, it is particularly preferable to employ this electroactive material as an anode active material.

According to the present invention, an anode active material used for a non-aqueous electrolyte secondary battery is provided whose primary component is an amorphous metal complex represented by the general formula $M_{2-2x}B_{2x}O_3$ (M is one or two or more metal elements selected from the transition metal elements, and $0<x<1$). This cathode active material is, for example, suitable as an anode active material for a lithium secondary battery. This type of anode active material can be, for example, an anode active material for a non-aqueous electrolyte secondary battery that is substantially formed from an amorphous metal complex that is represented by the aforementioned general formula. In addition, it is also possible for an anode active material for a non-aqueous electrolyte secondary battery to contain both an amorphous metal complex represented by the aforementioned general formula and a lithium component (lithium compound).

Furthermore, according to the present invention, a method of manufacturing this type of electroactive material is provided. One aspect of the method of manufacturing the electroactive material includes a step of preparing a metal complex represented by the general formula $M_{2-2x}B_{2x}O_3$. A step of amorphizing the metal complex is also included. The aforementioned M is one or two or more metal elements selected from the transition metal elements, and for example is one or two or more selected from V and Ti. In addition, x is a number that satisfies $0<x<1$.

Here, "amorphizing" means to relatively reduce the crystallinity of the prepared metal complex. Thus, the metal complex used in the aforementioned amorphizing step (i.e., the metal complex prior to the amorphizing step) is not limited to a substantially crystalline metal complex, and may contain an amorphous component. In addition, the metal complex after the amorphizing step is completed may be substantially amorphous, and may contain a crystalline component. In other words, the crystallinity of the metal complex after the amorphizing step is relatively reduced compared to before the aforementioned amorphizing step is used. Typically, a substantially crystalline metal complex will be made into a substantially amorphous metal complex by means of the amorphizing step.

Examples of a process that can be included in the aforementioned amorphizing step include a process in which the metal complex is mechanically mixed. A so-called mechanical milling process or a mechanical grinding process can be preferably employed. This type of process is preferred s primarily Fe.

Another method of manufacturing the electroactive material disclosed herein includes a process of rapidly cooling and solidifying a mixture from the melted state, in which the mixture contains a metal oxide in which the M in the aforementioned general formula is a constituent metal of metal oxide and a boron oxide (typically $B_2O_3$). Here, M is one or two or more metal elements selected from the transition metal elements (e.g., Fe, V, Ti). This method can be preferably applied to a metal complex in which M is primarily Fe, a metal complex in which M is V, and the like.

One preferred aspect of the method of manufacturing includes rapidly cooling and solidifying a mixture from the molten state, in which the mixture contains a metal oxide in which the aforementioned M is a constituent metal of metal oxide, the aforementioned boron oxide, and a lithium compound. Lithium compounds that can be included in the mixture can include, for example, one or two or more compounds selected from lithium salts such as $Li_2CO_3$ and the like. By employing this type of lithium compound, an electroactive material will be obtained that is equivalent to a state in which the lithium has been stored in advance. Due to this, a reduction in the irreversible capacity can be provided. In addition, by selecting a lithium compound that functions as a flux (e.g., $Li_2CO_3$), the melting point of the aforementioned mixture can be reduced. According to the present aspect, at least one effect from amongst these can be obtained.

Any of the electrode active materials described above can be ideally employed as the constituent material of a secondary battery (typically a lithium ion secondary battery). This type of secondary battery comprises, for example, a first electrode (a cathode or an anode) having any of the electrode active materials described above, a second electrode (an electrode that is opposite to the first electrode, e.g., an anode or a cathode) having a material that will store/discharge cations, and a non-aqueous electrolyte.

One non-aqueous electrolyte secondary battery provided by the present invention comprises an anode having any of the electroactive materials described above. In addition, the non-aqueous electrolyte secondary battery comprises a cathode having a material that stores and discharges alkali metal ions (preferably lithium ions). Furthermore, this secondary battery can comprise a non-aqueous electrolyte material. This type of secondary battery can attain good battery characteristics, because it comprises an electroactive material having improved charge/discharge characteristics.

BEST MODE FOR CARRYING OUT THE INVENTION

A preferred embodiment of the present invention will be described below in detail. Note that technological matters other than those specifically referred to in the present specification that are essential to the performance of the present invention can be understood as design particulars to one of ordinary skill in the art based upon the prior art in this field. The present invention can be performed based upon the technological details disclosed in the present specification and the common technical knowledge in this field.

An electroactive material according to the present invention is primarily composed of an amorphous metal complex (transition metal boron oxide complex). Preferably, the metal complex is amorphous to the extent that one or two or more of the following conditions are satisfied:

(1) Average crystal size is approximately 1000 angstroms or less (more preferably approximately 100 angstroms or less, even more preferably approximately 50 angstroms or less);

(2) Density of the metal complex is greater than the density (theoretical value) when completely crystalline by approximately 3% or more (more preferably approximately 5% or more); and (3) No peaks observed in an X-ray diffraction pattern that indicate a crystalline structure.

In other words, a typical example of the electroactive material disclosed herein is an electroactive material whose primary component is a transition metal boron oxide complex that satisfies one or two or more of the aforementioned conditions (1) to (3). For example, a metal complex that satisfies at least the aforementioned condition (3) is preferred. One preferred example of the electroactive material disclosed herein is an electroactive material whose primary component is a transition metal boron oxide complex that is amorphous to the extent that at least one or two or more of the aforementioned conditions (1) to (3) are satisfied (in particular, a transition metal boron oxide complex that satisfies at least the aforementioned condition (3)), e.g., an electroactive material that is substantially formed from this amorphous material. Note that an X-ray diffraction device which can be purchased from Rigaku Corporation (model number "Rigaku RINT 2100HLR/PC") and the like can be employed to obtain the aforementioned X-ray diffraction patterns. The application effect of the present invention will tend to be more fully expressed by employing a metal complex that is even more amorphous crystallinity is low).

The electroactive material can contain a lithium component. An electroactive material containing a lithium component as described above is included in the concept of "an electroactive material whose primary component is an amorphous metal complex represented by the general formula $M_{2-2x}B_{2x}O_3$". x is a number that satisfies $0<x<1$. The aforementioned lithium component can for example be contained as $Li_2CO_3$. The electroactive material containing a lithium component, as described above, can have an irreversible capacity that is even more reduced. Without being particularly limited hereto, the ratio of the lithium component to 1 mole of $M_{2-2x}B_{2x}O_3$ (the molar ratio of the lithium atom conversion) can for example be in the range of 5 moles or less (typically 0.05 to 5 moles), or can be in the range of 2 moles or less (typically 0.1 to 2 moles). The electroactive material according to the present invention is ideal for this type of lithium component to be included therein because the structure thereof is amorphous.

This type of electroactive material can be obtained by, for example, performing an amorphizing process on a transition metal boron oxide complex represented by the general formula $M_{2-2x}B_{2x}O_3$ (reducing the crystallinity of the complex). The method of manufacturing the metal complex used in the amorphizing process is not particularly limited, and a standard ceramic production method (solid phase reaction method, sintering method, etc.) may be employed. For example, by mixing a boron compound (e.g., boric acid $H_3BO_3$) with one or two or more types of an oxide containing the M in the aforementioned general formula as a constituent element, or a compound that can become this oxide by means of heating (a carbonate, nitrate, hydroxide, etc. of M), and heating the same, a metal complex for use in the amorphizing process can be manufactured. The transition metal boron oxide complex obtained in this way typically has a calcite type of crystalline structure.

One method that can be employed to amorphize the metal complex is, for example, a method in which the metal complex to be processed is mechanically mixed (a mechanical milling method, etc.). In addition, another example of an amorphizing method is one in which the aforementioned metal complex is rapidly cooled and solidified from the melted state. For example, the metal complex in the melted state will be placed in a low temperature medium (ice water or the like), and rapidly cooled and solidified. In addition, the so-called atomization method may also be employed. This type of amorphizing method can be repeatedly performed two or more times in accordance with need. In addition, two or more types of amorphizing methods can be combined and performed in accordance with need.

Another method of obtaining an amorphous transition metal boron oxide complex is one in which a mixture is prepared that contains a boron compound (e.g., a boron compound such as $B_2O_3$ or the like) and one or two or more types of an oxide containing the M in the aforementioned general formula as a constituent element, or a compound that can become this oxide by means of heating (a carbonate, nitrate, hydroxide, etc. of M), and rapidly cooling and solidifying this mixture from the melted state. The methods that can be employed to rapidly cool and solidify this mixture (melt) include a method in which the melt is placed in a low temperature medium, the atomization method, and the like. The solidified material obtained in this way may also be subjected to an amorphizing process by means of the mechanical mixing methods described above (mechanical milling, etc.).

The electroactive material according to the present invention can function as an electroactive material of a secondary battery by means of the insertion and extraction of various types of cations. The cations that are inserted and extracted include alkali metal ions such as lithium ions, sodium ions, potassium ions, cesium ions, and the like, alkaline earth metal ions such as calcium ions, barium ions, and the like, magnesium ions, aluminum ions, silver ions, zinc ions, ammonium ions such as tetrabutylammonium ions, tetraethylammonium ions, tetramethylammonium ions, triethylmethylammonium ions, triethylammonium ions, and the like, imidazolium ions such as imidazolium ions, ethylmethlimidazolium ions, and the like, pyridinium ions, oxygen ions, tetraethylphosphonium ions, tetramethylphosphonium ions, tetraphenylphosphonium ions, triphenylsulphonium ions, triethylsulphonium ions, and the like. Preferred from amongst these are alkali metal ions, and lithium ions are particularly preferred.

This electroactive material can be used as a cathode or an anode of a battery. When employed in the anode, a cathode active material can be preferably employed as the active material of the cathode (the opposite electrode) that contains (typically lithium ions) cations that are inserted into and extracted from the anode. For example, various lithium compound oxides can be employed whose constituent elements are lithium and a transition metal element. Examples of these types of lithium compound oxides include lithium cobalt oxides (e.g., $LiCoO_2$), lithium nickel oxides (e.g., $LiNiO_2$), lithium manganese oxides (e.g., $LiMnO_2$, $LiNi_{0.5}Mn_{1.5}O_4$, $LiMn_2O_4$), and the like. Examples of other a cathode active materials that contain lithium include $LiFePO_4$, $LiCoPO_4$, and the like. In addition, oxides such as $TiO_2$, $V_2O_5$, $MoO3$, and the like, sulfides such as $TiS_2$, FeS, and the like, and electroconductive polymers such as polyacetylene, polyparaphenylene, polyaniline, polypyrrole, and the like can also be used as an anode active material.

On the other hand, when the electrode active material is employed in an anode of a battery, metals such as Li, Mg, Al, and the like or alloys of the same, or carbonaceous materials and the like that can store/discharge cations, can be employed as the active material of the anode (the opposite electrode).

Note that electroactive materials in which M in the aforementioned general formula is primarily Fe, V, or Ti, or electroactive materials in which M is primarily one or two or more elements selected from Fe, V, and Ti, are particularly ideal for use as an anode active material.

An electrode having the aforementioned electroactive material according to the present invention can be suitably employed as an electrode of a secondary battery having various shapes, such as coin type, cylinder type, square type, and the like. For example, the electroactive material can be compression molded to form an electrode in the shape of a plate and the like. In addition, by adhering the aforementioned electroactive material to a collector composed of a conductive material such as metal or the like, a plate or sheet shaped electrode can be formed. This type of electrode can, in addition to the electroactive material according to the present invention, also contain the same one or two or more types of materials in an electrode having a standard electroactive material, in accordance with need. Representative examples of this type of material includes conductive material and a binding agent. Carbonaceous materials such as acetylene black and the like can be employed as a conductive material. In addition, organic polymers such as polyfluorovinylidene (PVDF), polytetrafluoroethylene (PTFE), polyfluorovinylidene-hexafluoropropylene copolymer (PVDF-HFP), and the like can be employed as a binding agent.

As the non-aqueous electrolyte employed in the secondary battery, an electrolyte containing a non-aqueous solvent, and a compound having cations that can be inserted and extracted from an electrode active material (supporting electrolyte) can be used.

An aprotonic solvent having carbonate, ester, ether, nitryl, sulfone, lactone, and the like can be employed as the non-aqueous solvent that forms the non-aqueous electrolyte, but is not limited thereto. For example, propylene carbonate, ethylene carbonate, diethyl carbonate, dimethyl carbonate, ethyl methyl carbonate, 1,2-dimethoxyethane, 1,2-diethoxyethane, acetonitrile, propionitrile, tetrahydrofuran, 2-methyltetrahydrofuran, dioxane, 1,3-dioxane, nitromethane, N,N-dimethylformamide, dimethylsulfoxide, sulfolane, ã-butyrolactone, and the like. Only one type may be selected from these non-aqueous solvents, or a mixture of two or more types may be employed.

In addition, as the supporting electrolyte that forms the non-aqueous electrolyte, one type or two or more types can be employed that are selected from compounds containing cations that can be inserted into and extracted from the electroactive material, e.g., lithium compounds (lithium salts) such as $LiPF_6$, $LiBF_4$, $LiN(CF_3SO_2)_2$, $LiCF_3SO_3$, $LiC_4F_9SO_3$, $LiC(CF_3SO_2)_3$ $LiClO_4$ and the like when a lithium ion secondary battery is used.

The present invention will be described below in further detail by means of examples, however the present invention is in no way limited to these examples.

Experimental Example 1

Figure 1:
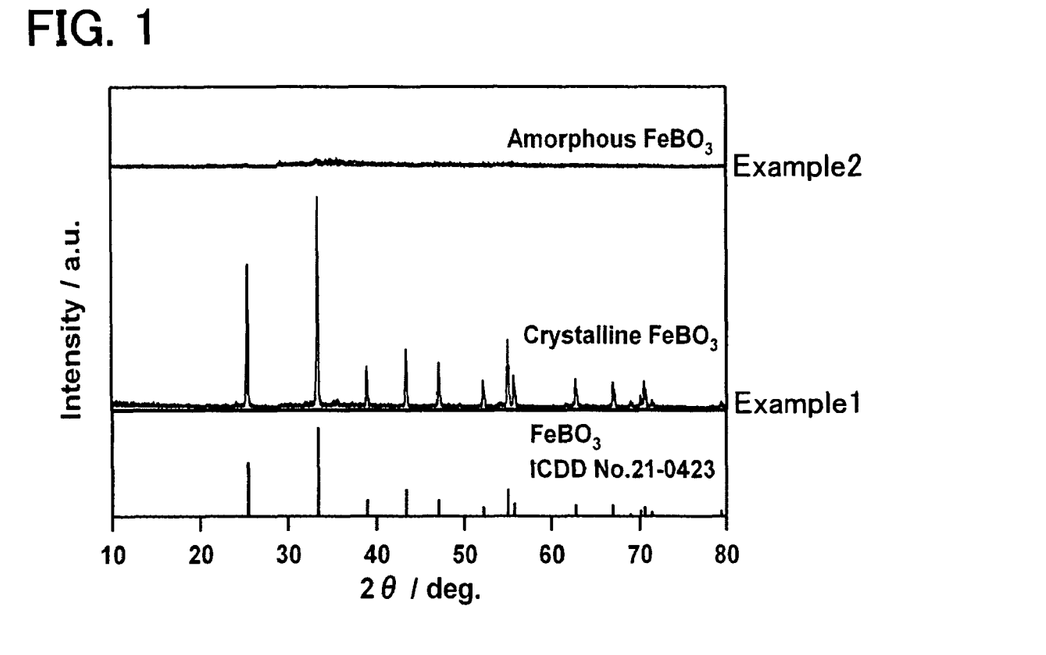
FIG. 1 is a graph showing the X-ray diffraction patterns of samples produced in Experimental Examples 1 and 2.

Production of an Fe Crystalline Sample $Fe_2O_3$ and $H_3BO_3$ were mixed together at a molar ratio of 1:2. This was sintered in atmospheric air for 24 hours at 670° C., and then for 48 hours at 750° C. The resulting product was milled by a standard method to obtain a sample (average particle diameter of approximately 16.8 μm), and powder X-ray diffraction (XRD) measurements were performed. An X-ray diffraction device (model number "Rigaku RINT 2100HLR/PC") which can be obtained from Rigaku Corporation was employed for the measurements. The results are shown in FIG. 1. As shown in the figure, a clear peak is seen in the X-ray diffraction pattern, which indicates that this sample is crystalline. In addition, this pattern matches well with data registered with the ICDD (ICDD No. 21-0423). Because of this, it was confirmed that the sample obtained by means of the present experimental example is calcite type single phase crystalline $FeBO_3$.

Experimental Example 2

Production of an Fe Amorphous Sample

The crystalline $FeBO_3$ obtained by means of Experimental Example 1 was amorphized by means of a mechanical milling method. A planetary ball mill (manufactured by Ito Seisakusho Co., Ltd, product number "LP-½") was employed to perform this mechanical milling. In other words, partially stabilized zirconia balls having diameters of 3 mm, 10 mm, 15 mm, and 20 mm were added to the pot of this ball mill (made of partially stabilized zirconia, capacity 80 mL) at a ratio of 100, 15, 4, and 2, respectively, and an $FeBO_3$ sample obtained by means of Experimental Example 1 (approximately 4 g) was also added therein. The rotation parameter was 200 rpm. XRD measurements were performed at fixed periods of time, and all peaks disappeared 48 hours after the mechanical milling was initiated. The X-ray diffraction pattern of the sample that was mechanically milled for 48 hours is shown in FIG. 1. The aforementioned method produced a substantially amorphous $FeBO_3$ sample (average particle diameter of approximately 2.98 μm). This corresponds to a situation in which M in the general formula $M_{2-2x}B_{2x}O_3$ is Fe, and x is ½.

Experimental Example 3

Figure 2:
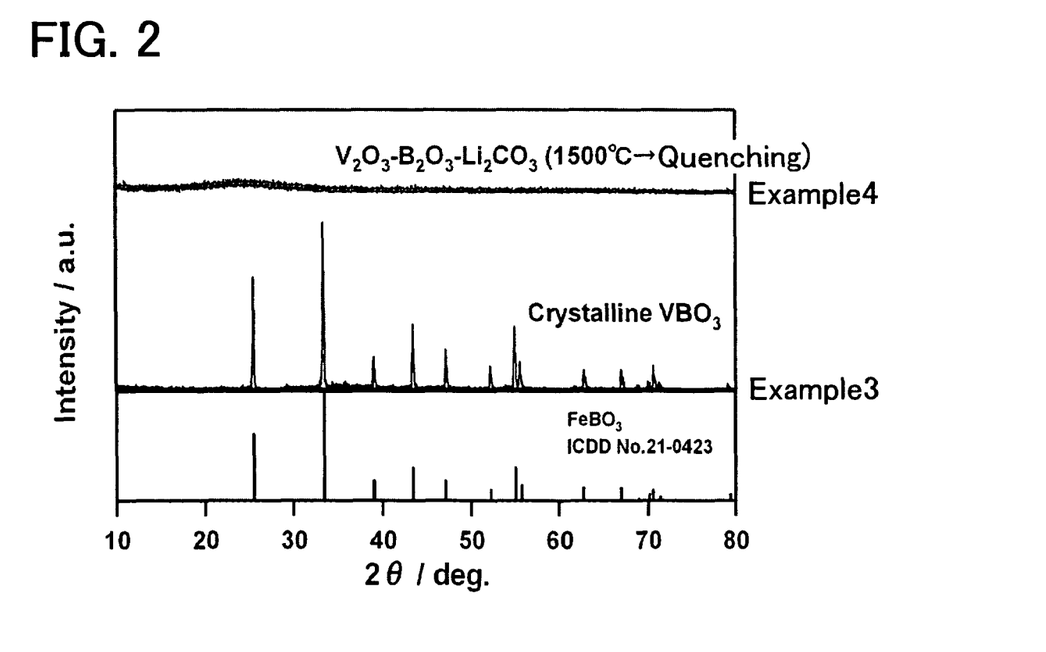
FIG. 2 is a graph showing the X-ray diffraction patterns of samples produced in Experimental Examples 3 and 4.

Production of a V Crystalline Sample $V_2O_3$ and $H_3BO_3$ were mixed together at a molar ratio of 1:2.1. This was sintered in atmospheric air for 24 hours at 670° C., and then for 24 hours at 1200° C. In order to prevent the oxidation of the vanadium, the aforementioned sintering was performed in an argon atmosphere that contained 5% $H_2$. The resulting product was milled in the same way as in Experimental Example 1, and XRD measurements were performed on the obtained sample. The results are shown in FIG. 2.

As shown in the figure, a clear peak is seen in the X-ray diffraction pattern, which indicates that this sample is crystalline. In addition, it was confirmed from the XRD results that this sample is crystalline $VBO_3$ having a crystal structure identical with the sample obtained by means of Experimental Example 1 (calcite type single phase).

Experimental Example 4

Production of a V Amorphous Sample

In the present experimental example, an amorphous sample was produced by means of rapidly cooling a melt whose primary component is a metal complex represented by the general formula $VBO_3$ (equivalent to M in the general formula $M_{2-2x}B_{2x}O_3$ being V, and x being ½).

A mixture of approximately 3 g of $V_2O_3$ as a vanadium source, approximately 1.4 g of $B_2O_3$ as a boron source, and approximately 1.5 g $Li_2CO_3$ as a lithium compound (a molar ratio of approximately 1:1:1) was melted for 15 minutes at 1500° C. This melt was placed in ice water and rapidly cooled, and an agate mortar was employed to perform pulverization by means of a chaster mill (stone mill). XRD measurements were performed on the powder obtained. The results are shown in FIG. 2. As shown in the figure, no peaks were observed in the X-ray diffraction pattern. This indicates that the sample (a $V_2O_3$—$B_2O_3$—$Li_2CO_3$ sample) is substantially amorphous.

Note that a mixture of $V_2O_3$ and $B_2O_3$ at a molar ratio of 1:1 would not melt even when heated to 1600° C. However, by adding an equimolar amount of $Li_2CO_3$ thereto, the melting point of the mixture (i.e., a $V_2O_3$—$B_2O_3$—$Li_2CO_3$ mixture at a molar ratio of approximately 1:1:1) could be reduced to 1500° C. or below. More specifically, the aforementioned mixture could be melted at a temperature of at least approximately 1400 to 1500° C.

In addition, when mechanical milling was performed on a crystalline $VBO_3$ sample obtained by means of Experimental Example 3 in the same way as in Experimental Example 3, a peak was still present in the X-ray diffraction pattern even after 48 hours of mechanical milling.

Experimental Example 5

Production of Measurement Cells

The samples obtained by means of Experimental Examples 1 to 4 were employed to produce measurement cells.

In other words, approximately 0.25 g of sample as the electroactive material was mixed together with approximately 0.089 g of acetylene black (AB) as a conductive material and approximately 0.018 g of polytetrafluoroethylene (PTFE) as a binding agent (a mass ratio of approximately 70:25:15). This mixture was compression molded into a plate shape having a diameter of 1.0 cm and a thickness of 0.5 mm to produce a test electrode. A lithium foil having a diameter of 1.5 mm and a thickness of 0.15 mm was employed as the opposite electrode. A porous polyethylene sheet having a diameter of 22 mm and a thickness of 0.02 mm was employed as a separator. In addition, a non-aqueous electrolyte was used in which $LiPF_6$ was dissolved at a concentration of approximately 1 mole/liter in a mixed solvent of ethylene carbonate (EC) and diethyl carbonate (DEC) having a specific volume of 1:1. These elements were combined in a stainless steel vessel, and a coin type cell having a thickness of 2 mm and a diameter of 32 mm (2032 type) was constructed.

Experimental Example 6

Evaluation of the Fe Samples

Figure 3:
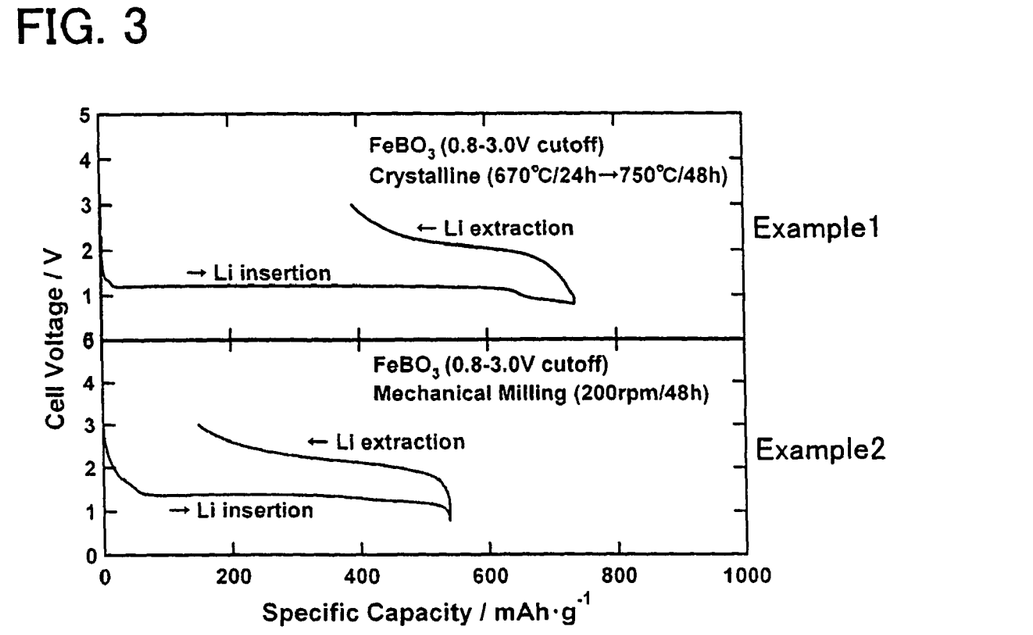
FIG. 3 is a graph showing the charge/discharge profiles of samples produced in Experimental Examples 1 and 2.

Measurement cells produced by employing the sample of Experimental Example 1 and the sample of Experimental Example 2 were discharged for approximately 12 hours after production, and a constant current charge/discharge test was then performed as described below. In other words, Li was inserted (charge) at a current density of 0.1 mA/cm$^2$ up to a voltage of 0.8 V (hereinafter Li/Li+), and then Li was extracted (discharge) at the same current density up to a voltage of 3.0 V. The cell voltage was recorded every one minute. The initial charge/discharge profile is shown in FIG. 3.

As shown in the figure, the initial capacity of the cell that employed the sample of Experimental Example 1 (crystalline) was approximately 700 mAh/g, the irreversible capacity was approximately 390 mAh/g, and the ratio of the irreversible capacity to the initial capacity was approximately 56%. In contrast, the initial capacity of the cell that employed the sample of Experimental Example 2 (amorphous) was approximately 530 mAh/g; the irreversible capacity was approximately 180 mAh/g; and the ratio of the irreversible capacity to the initial capacity was approximately 34%. Thus, according to the amorphous sample of Experimental Example 2, the irreversible capacity can be reduced by half compared to the crystalline sample of Experimental Example 1. In addition, the ratio of the irreversible capacity to the initial capacity was considerably reduced. Note that the discharge profiles for both the crystalline sample (Experimental Example 1) and the amorphous sample (Experimental Example 2) both had a flat voltage portion near 1.3V at the initial Li insertion stage.

Experimental Example 7

Evaluation of the V Samples

Measurement cells produced by employing the sample of Experimental Example 3 and the sample of Experimental Example 4 were discharged for approximately 12 hours after production. Thereafter, a constant current charge/discharge test was performed under the various conditions described below.

Measurement Example 1

A voltage of 4.5 volts was applied (charge) to a measurement cell in which the amorphous sample of Experimental Example 4 was employed (the $V_2O_3$—$B_2O_3$—$Li_2CO_3$ sample). Next, Li was inserted at a current density of 0.1 mA/cm$^2$ up to a voltage of 0.2 V, and Li was extracted at the same current density, up to a voltage of 2.5 V (e.g., a cycle voltage range of 0.2 to 2.5 V). That charge/discharge profile is shown in the upper portion of FIG. 4 (Measurement Example 1). As shown in the figure, at the point at which a voltage of 4.5 V is initially applied, the extraction of lithium was not substantially observed (the portion in which the characteristic curve rises up to 4.5 V along the vertical axis). This result suggests that the Li employed when an amorphous sample is produced is maintained in the sample lattice even in a subsequent charging process. This is thought to be due to the Li in the amorphous sample of Experimental Example 4 being trapped in the dangling bonds in the vitreous network, and electrochemical extraction being prevented.

Figure 4:
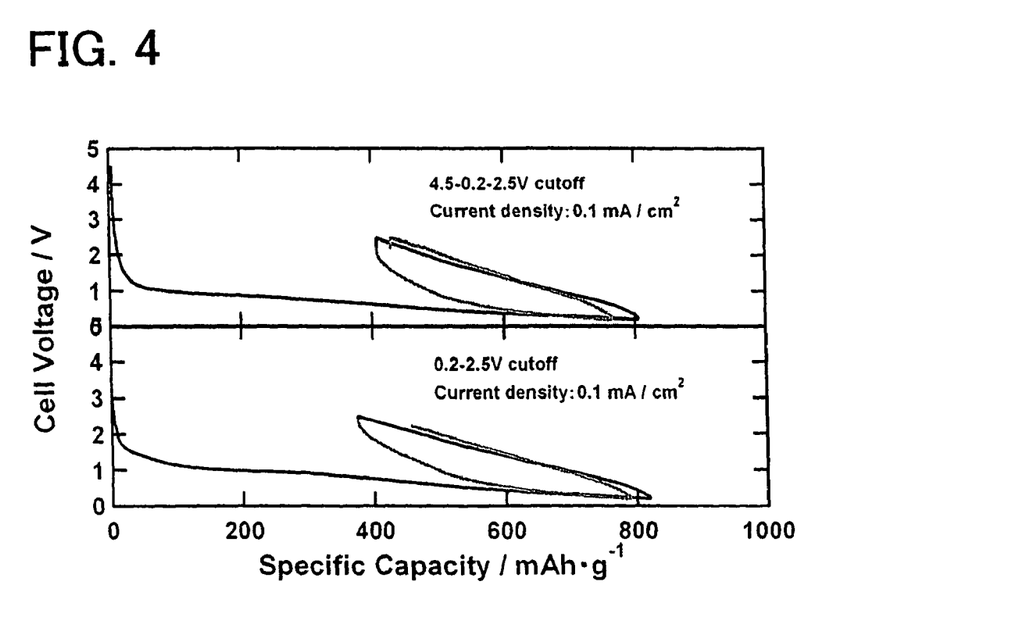
FIG. 4 is a graph showing the charge/discharge profiles of a sample produced in Experimental Example 4.

In addition, when the step of initially applying a voltage of 4.5 V was omitted, Li was inserted at a current density of 0.1 mA/cm$^2$ up to a voltage of 0.2 V, and Li was extracted at the same current density up to a voltage of 2.5 V (e.g., a cycle voltage range of 0.2 to 2.5 V), as shown in the lower portion of FIG. 4, approximately the same charge/discharge profile as Measurement Example 1 was obtained. Because this result was obtained, the charge/discharge cycle was initiated at the point of Li insertion in the measurement examples below.

Measurement Example 2,3

Li was inserted in cell in which the crystalline sample of Experimental Example 3 was employed at a current density of 0.1 mA/cm$^2$ up to a cell voltage of 0.2 V, and Li was extracted at the same current density up to a cell voltage of 2.5 V (e.g., a cycle voltage range of 0.2 to 2.5 V). That charge/discharge profile is shown in the uppermost portion of FIG. 5 (Measurement Example 2). In the present measurement example, the ratio of the irreversible capacity to the initial capacity (irreversible region) is approximately 42%.

In addition, the charge/discharge test performed was identical to that of Measurement Example 3, except for the fact that the cycle voltage range is 0.0 to 2.5 V (e.g., Li insertion was executed until the cell voltage was lower than Measurement Example 3). That result is shown in the second level of FIG. 5 (Measurement Example 3). In the present measurement example, the irreversible range ratio was approximately 56%.

Measurement Examples 4, 5

The Measurement Example 4 described above is equivalent to a situation in which a charge/discharge test is performed under the same conditions as Measurement Example 3 (current density and cycle voltage range), on a cell in which the amorphous sample of Experimental Example 4 was employed. In order to make it easy to comparatively study the measurement results, that charge/discharge profile is shown in the third level of FIG. 5 (Measurement Example 4). The irreversible range ratio in the present measurement example was approximately 47%. In addition, the irreversible capacity was approximately 400 mAb/g.

Furthermore, a charge/discharge test was performed under the same conditions as Measurement Example 4, on a cell in which the amorphous sample of Experimental Example 4 was employed. That result is shown in the lowermost level of FIG. 5 (Measurement Example 5). The irreversible range ratio in the present measurement example was approximately 37%.

Figure 5:
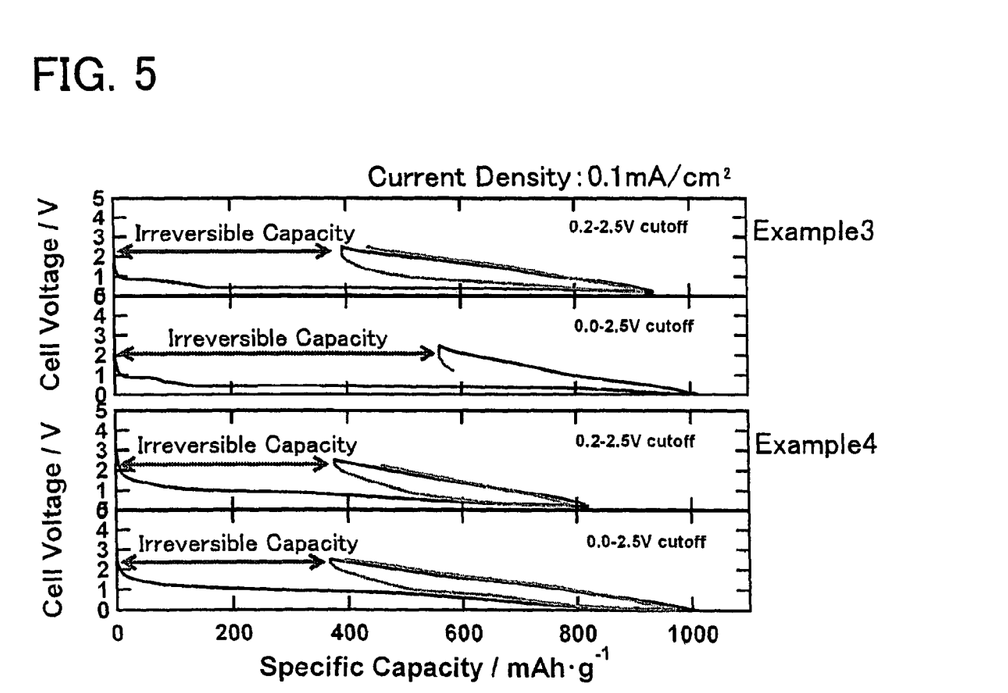
FIG. 5 is a graph showing the charge/discharge profiles of samples produced in Experimental Examples 3 and 4.

The results shown in FIG. 5 markedly indicate that compared to a shallow cycle in which the cutoff voltage during Li insertion was 0.2 V (Measurement Examples 2, 4), the irreversible range will be reduced with a deeper cycle in which the cutoff voltage was 0.0 V (Measurement Examples 3, 5). As understood from the comparison between the second level and the lowermost level of FIG. 5, the irreversible capacity in Measurement Example 5 was reduced by approximately 1 Li equivalent (1 Li is equivalent to 244 mAb/g in capacity) with respect to Measurement Example 3. This result suggests that an irreversible capacity compensation effect was demonstrated by the Li provided in advance in the sample of Experimental Example 4 (the $V_2O_3$-$B_2O_3$—$Li_2CO_3$ sample).

Measurement Examples 6, 7

In Measurement Examples 2 to 5 described above, a charge/discharge test was performed with the current density at 0.1 mA/cm$^2$. This current density was changed to 1.0 mA/cm$^2$, and further studies were performed.

In other words, a charge/discharge test was performed on a cell in which the crystalline sample of Experimental Example 3 was employed, under conditions in which the current density was 1.0 mA/cm$^2$ and the cycle voltage range was 0.0 to 2.5 V. In order to make it easy to comparatively study the measurement results, the charge/discharge profile of Measurement Example 3 measured at 0.1 mA/cm$^2$ is shown in the uppermost level of FIG. 6 (irreversible range approximately 56%), and the charge/discharge profile of Measurement Example 6 measured at 1.0 mA/cm$^2$ is shown in the second level of FIG. 6. The irreversible range ratio in Measurement Example 6 was approximately 67%.

In addition, a charge/discharge test was performed on a cell in which the amorphous sample of Experimental Example 4 was employed, under conditions in which the current density was 1.0 mA/cm$^2$ and the cycle voltage range was 0.0 to 2.5 V like that of Measurement Example 6 (Measurement Example 7). In order to make it easy to comparatively study the measurement results, the charge/discharge profile of Measurement Example 5 in which the same sample was measured at 0.1 mA/cm$^2$ is shown in the third level of FIG. 6 (irreversible range approximately 37%), and the charge/discharge profile of Measurement Example 7 in which the same sample was measured at 1.0 mA/cm$^2$ is shown in the lowermost level of FIG. 6. The irreversible range ratio in Measurement Example 7 was approximately 41%.

Figure 6:
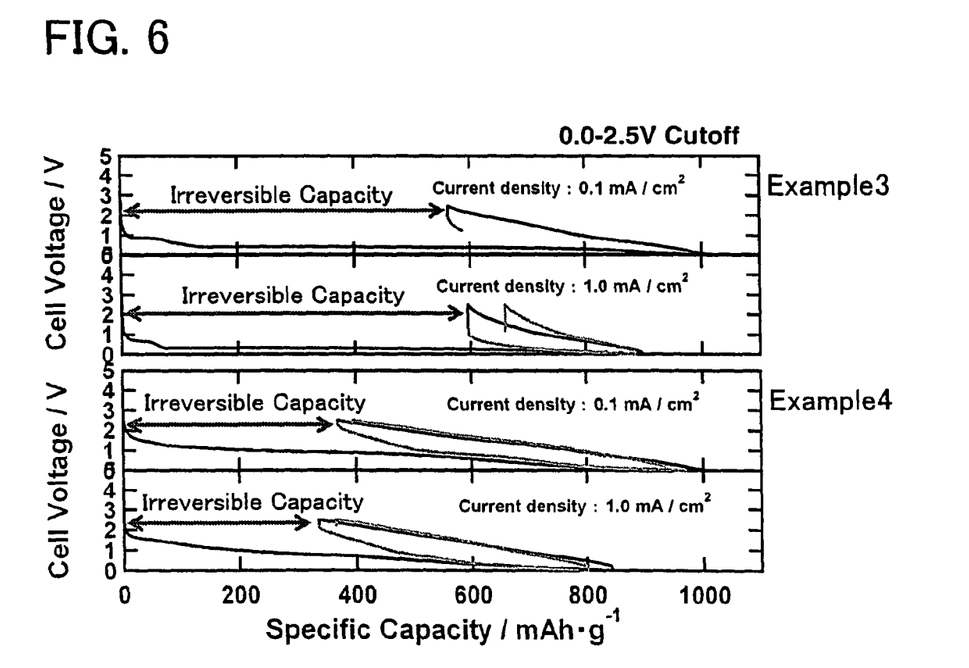
FIG. 6 is a graph showing the charge/discharge profiles of samples produced in Experimental Examples 3 and 4.

The results shown in FIG. 6 show that in addition to low rate situations in which the current density is 0.1 mA/cm$^2$ (Measurement Examples 3, 5), an irreversible capacity compensation effect was also clearly demonstrated at a high rate of 1.0 mA/cm$^2$ (Measurement Examples 6, 7) by means of the amorphizing effect described above and by the Li component that was provided in advance. For example, with a current density of 0.1 mA/cm$^2$, the sample of Experimental Example 3 had an irreversible range ratio of approximately 56% (Measurement Example 3), but with the sample of Experimental Example 4, the irreversible range ratio was dramatically reduced to approximately 37% (Measurement Example 5). In addition, with a current density of 1.0 mA/cm$^2$, the sample of Experimental Example 3 had an irreversible range ratio of approximately 67% (Measurement Example 6), but the irreversible range ratio was approximately 41% with the sample of Experimental Example 4 (Measurement Example 7), and thus a dramatic reduction in the irreversible range was observed even at this current level.

Furthermore, the following study of a V type amorphous material was performed, in which the value of x in the general formula $V_{2-2x}B_{2x}O_3$ was different. In other words, a V type amorphous sample in which x in the general formula $V_{2-2x}B_{2x}O_3$ is ⅓, and a V type amorphous sample in which x is ¼, were respectively produced by the same method as Experimental Example 4. These samples were employed to construct measurement cells that are identical to Experimental Example 5. Then, a charge/discharge test was performed on a measurement cell in which each sample was employed under conditions identical to the aforementioned Measurement Example, and in which the cycle voltage range was 0.2 to 2.5 V and the current density was 0.1 mA/cm$^2$. The results were that the irreversible capacity of the sample in which x is ⅓ (e.g., $V_4B_2O_9$) was approximately 450 mAh/g, and the irreversible capacity of the sample in which x is ¼ (e.g., $V_3BO_6$) was approximately 500 mAh/g.

Specific examples of the present invention were described in detail above. However, these are simply examples, and do not limit the scope of the patent claims. The technology disclosed in the scope of the patent claims includes various modifications and changes of the specific examples illustrated above.

In addition, the technological components described in the present specification or figures exhibit technological utility either independently or in various combinations, and are not limited by the combinations disclosed in the claims at the time of application. Furthermore, the technology illustrated in the present specification or the figures simultaneously achieves a plurality of objects, and has technological utility by achieving one object from amongst these.

The invention claimed is:

1. An electroactive material whose primary component is an amorphous metal complex represented by the general formula $M_{2-2x}B_{2x}O_3$ wherein 50% or more of the M is vanadium and 0<x<1.

2. The electroactive material of claim 1, wherein said amorphous metal complex satisfies one or two or more of the following conditions:
   (1) average crystal size is 1000 angstroms or less;
   (2) density of the metal complex is greater than the theoretical value of the density when completely crystalline by 3% or more; and
   (3) no peaks observed in an X-ray diffraction pattern that indicates a crystalline structure.

3. The electroactive material of claim 1, wherein the electroactive material is employed as a cathode active material of a non-aqueous electrolyte secondary battery.

4. A method of manufacturing an electroactive material whose primary component is an amorphous metal complex, comprising:

a step of preparing a metal complex represented by the general formula $M_{2-2x}B_{2x}O_3$, wherein 50% or more of the M is vanadium and $0<x\leq1$; and a step of amorphizing the metal complex.

5. The method of claim 4, wherein said amorphizing step includes a process of mechanically mixing said metal complex.

6. A method of manufacturing an electroactive material whose primary component is an amorphous metal complex represented by the general formula $M_{2-2x}B_{2x}O_3$, wherein 50% or more of the M is vanadium and $0<x<1$, comprising:

a step of preparing a mixture that contains a metal oxide in which M in said general formula is a constituent metal element and a boron oxide compound; and a step of rapidly cooling and solidifying the mixture from a melted state.

7. The method of claim 6, wherein the mixture further comprises a lithium compound.

8. A non-aqueous electrolyte secondary battery, comprising:

an anode having an electroactive material whose primary component is an amorphous metal complex represented by the general formula $M_{2-2x}B_{2x}O_3$ wherein 50% or more of the M is vanadium and $0<x<1$;

a cathode having a material that stores/discharges alkali metal ions; and a non-aqueous electrolyte.

9. The non-aqueous electrolyte secondary battery of claim 8, wherein said alkali metal is lithium.

10. An anode active material for a non-aqueous electrolyte secondary battery whose primary component is an amorphous metal complex represented by the general formula $M_{2-2x}B_{2x}O_3$, wherein 50% or more of the M is vanadium and $0<x\leq1$.

11. An electroactive material, comprising an amorphous metal complex represented by the general formula $M_{2-2x}B_{2x}O_3$, as a primary component, wherein 50% or more of the M is vanadium and $0<x<1$, and wherein the electroactive material further comprises a lithium compound.

12. The electroactive material of claim 1, wherein 90% or more of the M is vanadium 13. The non-aqueous electrolyte secondary battery of claim 8, wherein 90% or more of the M is vanadium.

14. The anode active material of claim 10, wherein 90% or more of the M is vanadium.

15. The electroactive material of claim 11, wherein 90% or more of the M is vanadium.

* * * * *

UNITED STATES PATENT AND TRADEMARK OFFICE
CERTIFICATE OF CORRECTION

PATENT NO.         : 7,842,419 B2                                         Page 1 of 1
APPLICATION NO.    : 11/413207
DATED              : November 30, 2010
INVENTOR(S)        : Shigeto Okada et al.

It is certified that error appears in the above-identified patent and that said Letters Patent is hereby corrected as shown below:

Title page, item 57 (Abstract), lines 7 and 12, "$M_{2-2x}O_{2x}O_3$" should read -- $M_{2-2x}B_{2x}O_3$ --;

Claim 12, col. 14, line 19, insert a -- . -- after "vanadium.".

Signed and Sealed this
Fifteenth Day of March, 2011

David J. Kappos
*Director of the United States Patent and Trademark Office*